(12) United States Patent
Hoffman

(10) Patent No.: US 6,904,304 B2
(45) Date of Patent: Jun. 7, 2005

(54) CT DETECTOR REFLECTOR USEFUL IN DETECTOR SCINTILLATOR ARRAY

(75) Inventor: David M. Hoffman, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 294 days.

(21) Appl. No.: 10/136,143

(22) Filed: May 1, 2002

(65) Prior Publication Data

US 2002/0123683 A1 Sep. 5, 2002

Related U.S. Application Data

(63) Continuation-in-part of application No. 09/751,872, filed on Dec. 29, 2000, now abandoned.

(51) Int. Cl.⁷ .............................. A61B 5/05; G01F 23/00
(52) U.S. Cl. .................................. 600/407; 250/363.01
(58) Field of Search .............................. 600/407, 1, 2, 600/3, 410, 408, 409, 411, 420; 250/363.01, 361; 606/2, 26, 27, 32

(56) References Cited

U.S. PATENT DOCUMENTS 3,567,925 A  * 3/1971  Muga et al. ........... 250/363.01
3,944,835 A    3/1976  Vosburgh
4,070,581 A    1/1978  Gibbons et al.
4,317,037 A    2/1982  Suzuki et al.
4,442,360 A    4/1984  Suzuki et al.
4,560,882 A   12/1985  Barbarie et al.
4,830,830 A  * 5/1989  Tamotu et al. ............... 204/603
5,245,648 A    9/1993  Kinney et al.
5,276,328 A    1/1994  Yoshida et al.
5,325,855 A  * 7/1994  Daghighian et al. ........ 600/407
5,386,122 A    1/1995  Yoshida et al.
5,424,546 A    6/1995  Okada et al.
5,651,047 A  * 7/1997  Moorman et al. ......... 378/98.8
5,856,673 A    1/1999  Ikegami et al.
6,031,234 A    2/2000  Albagli et al.
6,384,417 B1   5/2002  Okumura et al.
6,445,945 B1 * 9/2002  Arsenault ................... 600/431
6,717,150 B2 * 4/2004  Hoffman ................ 250/370.11

FOREIGN PATENT DOCUMENTS

JP            361100683 A  *  5/1986  ............. G01T/3/06

* cited by examiner

Primary Examiner—Daniel Robinson
(74) Attorney, Agent, or Firm—Armstrong Teasdale LLP

(57) ABSTRACT

A method for making a detector array comprising a photosensor and scintillators, including placing a thermoplastically encased reflective film between scintillators of a scintillator array and optically coupling the scintillators with the photosensor.

13 Claims, 3 Drawing Sheets

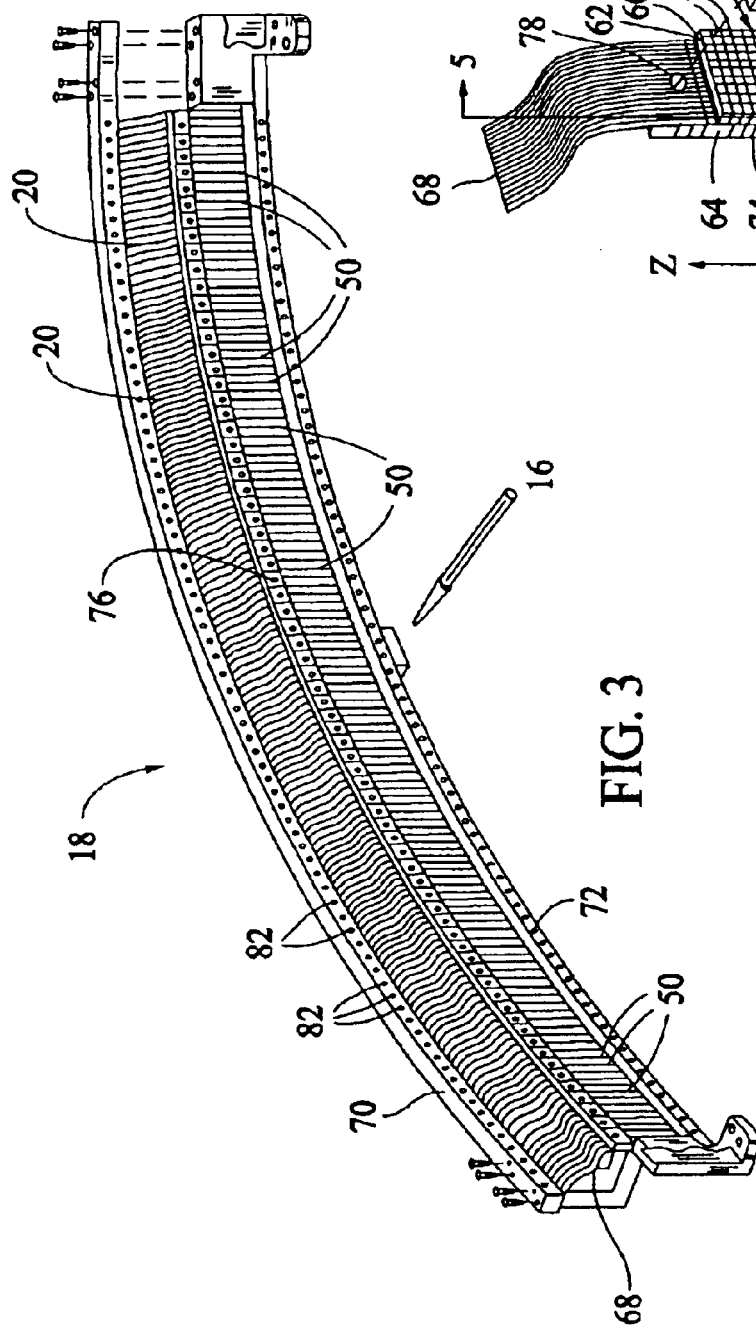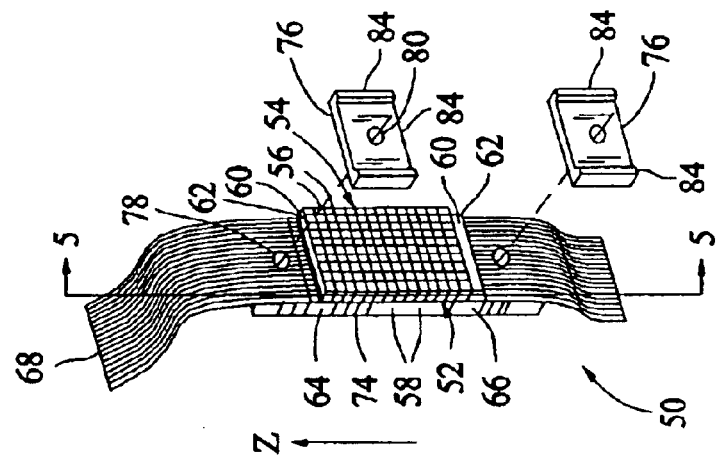

CT DETECTOR REFLECTOR USEFUL IN DETECTOR SCINTILLATOR ARRAY

CROSS REFERENCE TO RELATED APPLICATIONS

This application is a Continuation In Part of U.S. patent application Ser. No. 09/751,872 filed Dec. 29, 2000 now abandoned.

BACKGROUND OF THE INVENTION

This invention relates generally to a computer tomograph (CT) imaging system and more particularly to a CT detector module and reflector useful therewith and to methods for preparing and using the detector module and reflector.

In at least one known computed tomography (CT) imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two-dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

At least one known detector in CT imaging systems comprises a plurality of detector modules, each having a scintillator array optically coupled to a semiconductor photodiode array that detects light output by the scintillator array. The scintillator array in at least one known CT detector is produced with individual diced scintillator elements with the gap between scintillators elements filled with a reflector material applied through a casting operation. This cast reflector is made of a two part epoxy and a chrome pigment used in one known typical CT semiconductor photodiode detector array. Such cast reflectors are sometimes damaged by X-ray exposure which causes color center formation, reduces reflectivity and causes lower light output from each photodiode detector cell. Cast reflectors are protected by tungsten wires and plates in known CT systems and have a certain thickness to sufficiently reduce cross talk. Cast reflectors are typically produced in a casting process whereby the scintillator array and epoxy is cast in molds.

Accordingly it would be desirable to provide an improved reflector which is comparatively less susceptible to radiation damage, offers enhanced resistance to color center formation and thereby provides improved light collection efficiency along with potentially lower cross talk.

BRIEF SUMMARY OF THE INVENTION

There is therefore provided in one embodiment of this invention, a computed tomograph (CT) imaging system having a rotating gantry, a radiation source, a detector array on the rotating gantry and configured to detect radiation from the radiation source and the detector array. The detector array includes a photosensor array and an array of scintillators optically coupled to the photosensor array and a thermoplastic encased reflective film between and in front of the scintillators of the scintillator array. The reflector is thin and is less susceptible to x-ray damage.

These and other embodiments of the invention provide various combinations of additional advantages, including lower manufacturing cost due to use of a lamination reflector fabrication process, and lower cross talk.

BRIEF DESCRIPTION OF THE DRAWINGS

FIG. 3 is a perspective view of a CT system detector array.

FIG. 4 is a perspective view of a detector module shown in FIG. 3.

DETAILED DESCRIPTION

Figure 1:
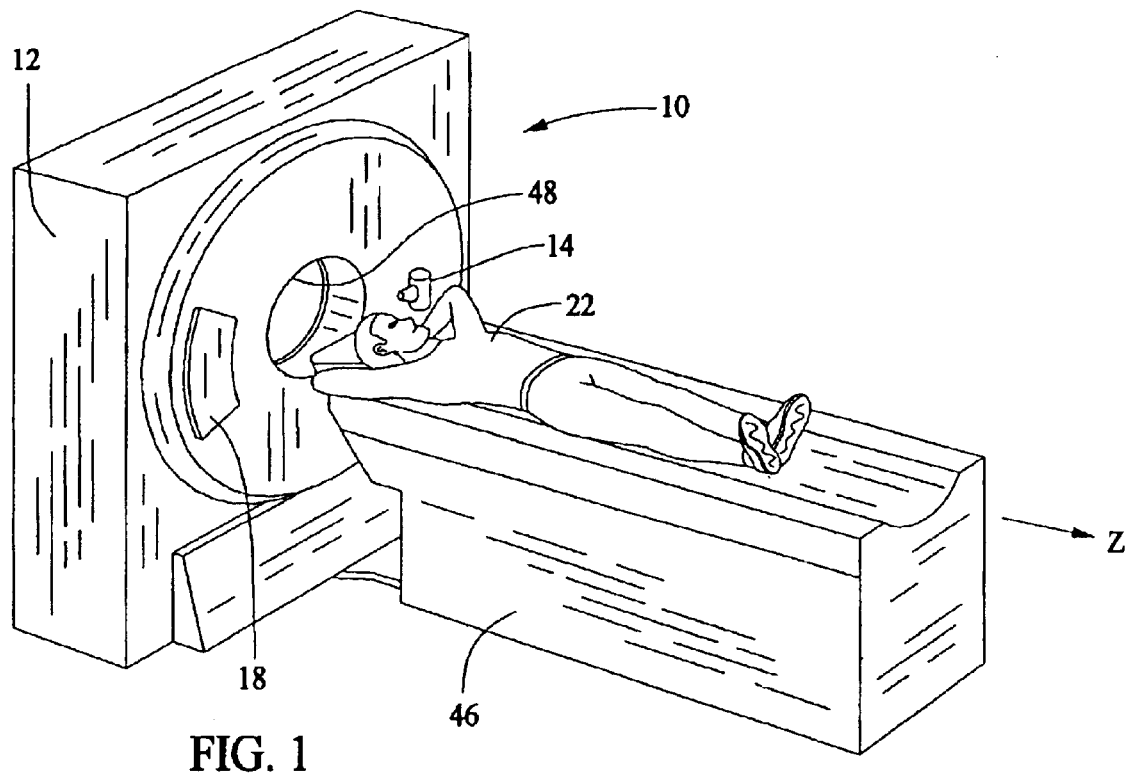
FIG. 1 is a pictorial view of a CT imaging system.
Figure 2:
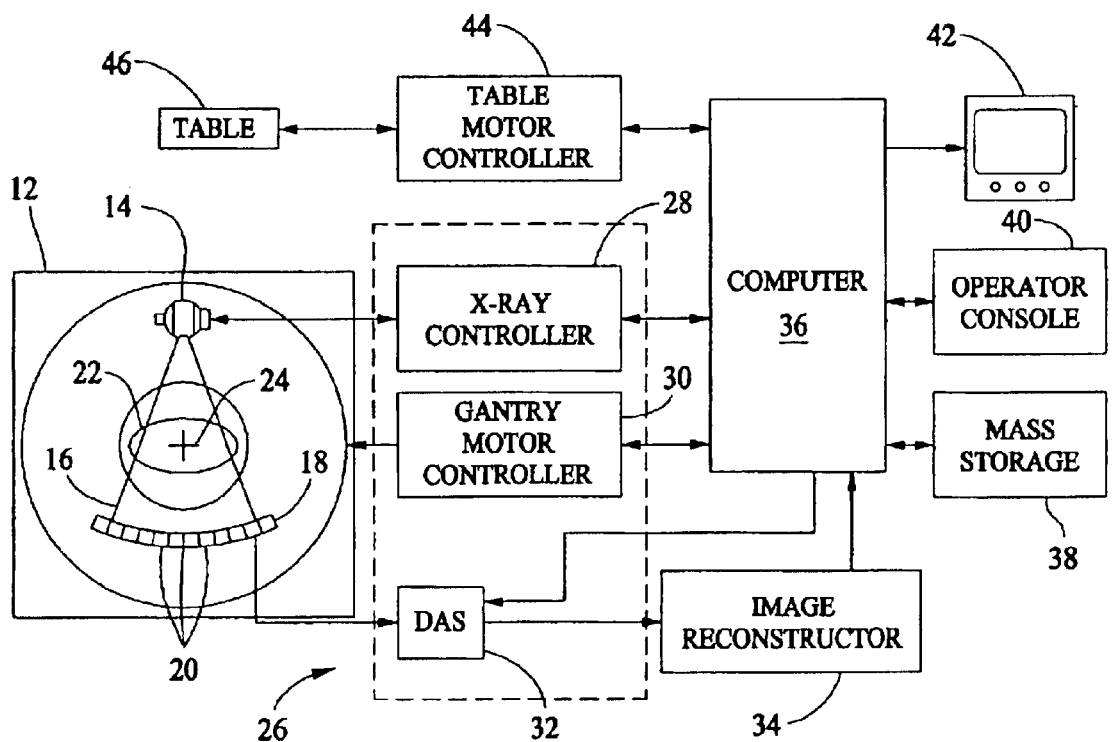
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example a medical patient. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24. Detector array 18 may be fabricated in a single slice or multi-slice configuration. In a multi-slice configuration, detector array 18 has a plurality of rows of detector elements 20, only one of which is shown in FIG. 2.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28, and gantry motor controller 30. In addition, computer 36 operates a table motor controller 44 which controls a motorized table 46 to position patient 22 in gantry 12. Particularly, table 46 moves portions of patient 22 through gantry opening 48.

As shown in FIGS. 3 and 4, detector array 18 includes a plurality of detector modules 50, each module comprising an array of detector elements 20. Each detector module 50 includes a high-density photosensor array 52 and a multidimensional scintillator array 54 positioned above and adjacent to photosensor array 52. Particularly, scintillator array 54 includes a plurality of scintillators 56, while photosensor array 52 includes photodiodes 58, a switch apparatus 60, and a decoder 62. A material such as a titanium dioxide-filled epoxy fills the small spaces in front of and between scintillator elements. Photodiodes 58 are individual photodiodes. In another embodiment, photodiodes 58 are a multidimensional diode array. In either embodiment, photodiodes 58 are deposited or formed on a substrate. Scintillator array 54, as known in the art, is positioned over or adjacent photodiodes 58. Photodiodes 58 are optically coupled to scintillator array 54 and have electrical output lines for transmitting signals representative of the light output by scintillator array 54. Each photodiode 58 produces a separate low level analog output signal that is a measurement of beam attenuation for a specific scintillator of scintillator array 54. Photodiode output lines (not shown in FIG. 3 or 4) may, for example, be physically located on one side of module 20 or on a plurality of sides of module 20. In the embodiment illustrated in FIG. 4, photodiode outputs are located at opposing sides of the photodiode array.

In one embodiment, as shown in FIG. 3, detector array 18 includes fifty-seven detector modules 50. Each detector module 50 includes a photosensor array 52 and scintillator array 54, each having a detector element 20 array size of 16×16. As a result, array 18 is segmented into 16 rows and 912 columns (16×57 modules) allowing up to N=16 simultaneous slices of data to be collected along a z-axis with each rotation of gantry 12, where the z-axis is an axis of rotation of the gantry.

Switch apparatus 60 is a multidimensional semiconductor switch array. Switch apparatus 60 is coupled between photosensor array 52 and DAS 32. Switch apparatus 60, in one embodiment, includes two semiconductor switch arrays 64 and 66. Switch arrays 64 and 66 each include a plurality of field effect transistors (FETS) (not shown) arranged as a multidimensional array. Each FET includes an input electrically connected to one of the respective photodiode output lines, an output, and a control (not shown) arranged as a multidimensional array.

Each FET includes an input electrically connected to one of the respective photodiode output lines, an output, and a control (not shown). FET outputs and controls are connected to lines that are electrically connected to DAS 32 via a flexible electrical cable 68.

Particularly about one-half of the photodiode output lines are electrically connected to each FET input line of switch 64 with the other one-half of photodiode output lines electrically connected to FET input lines of switch 66. Flexible electrical cable 68 is thus electrically coupled to photosensor array 52 and is attached, for example, by wire bonding.

Decoder 62 controls the operation of switch apparatus 60 to enable, disable, or combine photodiode 58 outputs depending upon a desired number of slices and slice resolution for each slide. Decoder 62 in one embodiment, is a FET controller as known in the art. Decoder 62 includes a plurality of output and control lines coupled to switch apparatus 60 and DAS 32. Particularly, the decoder outputs are electrically coupled to the switch apparatus control lines to enable switch apparatus 60 to transmit the proper data from the switch apparatus inputs to the switch apparatus outputs.

Utilizing decoder 62, specific FET's within switch apparatus 60 are selectively enabled, disabled, or combined so that specific photodiode 58 outputs are electrically connected to CT system DAS 32. Decoder 62 enables switch apparatus 60 so that a selected number of rows of photosensor array 52 are connected to DAS 32, resulting in a selected number of slices of data being electrically connected to DAS 32 for processing.

As shown in FIG. 3, detector modules 50 are filled in a detector array 18 and secured in place by rails 70 and 72. FIG. 3 shows rail 72 secured in place, while rail 70 is positioned to be secured over electrical cable 68, over module substrate 74, flexible cable 68, and mounting bracket 76. Screws (not shown in FIG. 3 or 4) are then threaded through holes 78 and 80 and into threaded holes 82 of rail 70 to secure modules 50 in place. Flanges 84 of mounting brackets 76 are held in place by compression against rails 70 and 72 (or by bonding, in one embodiment) and prevent detector modules 50 from "rocking". Mounting brackets 76 also clamp flexible cable 68 against substrate 74. In one embodiment, flexible cable 68 is also adhesively bonded to substrate 74. If desired, photosensor array can be adhesively bonded to the substrate. Flexible cable 68 is also electrically and mechanically bonded to photosensor array 52, for example, by wire bonding.

Figure 5:
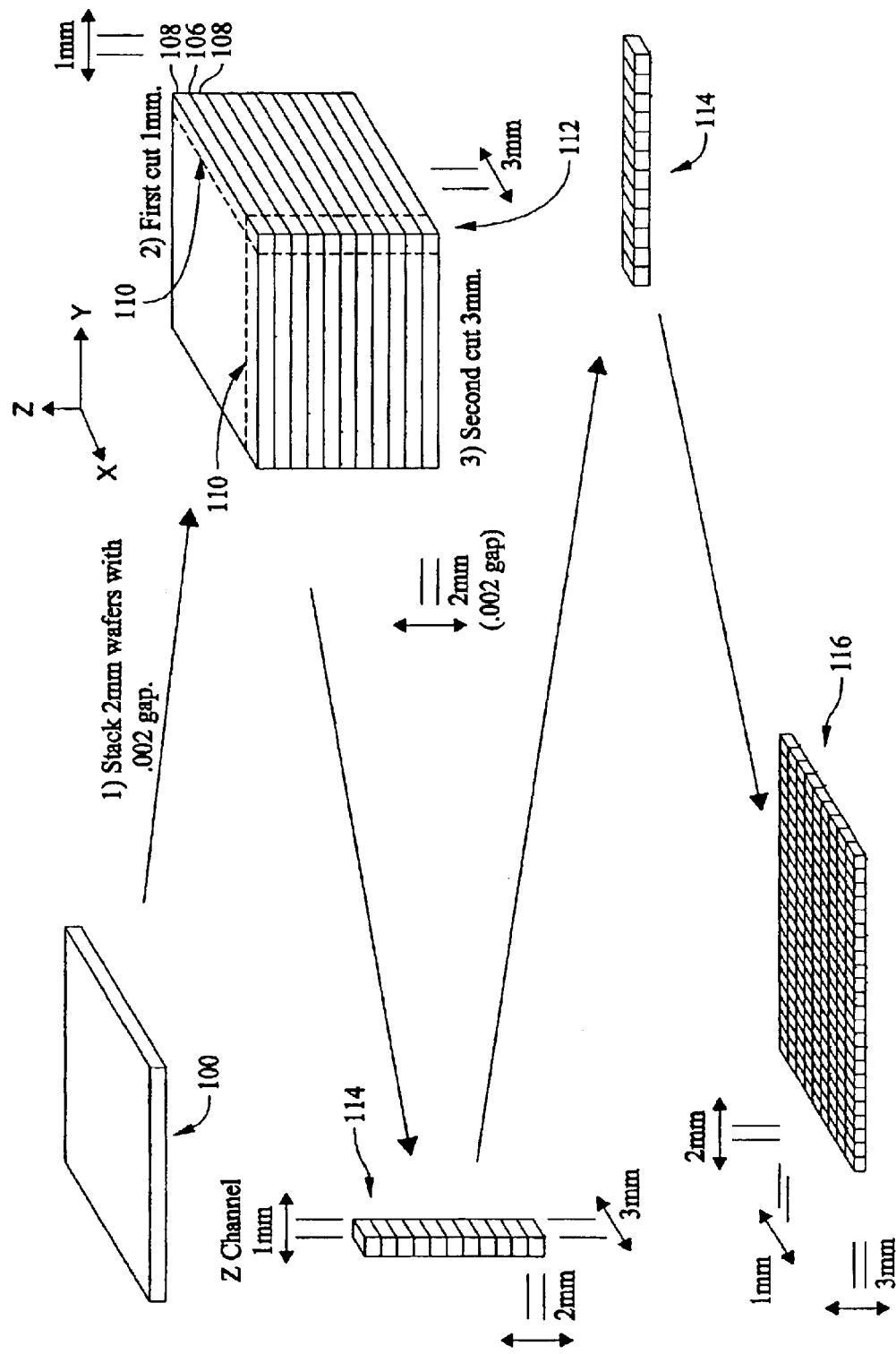
FIG. 5 presents an overview of several embodiments of a process for preparing an improved reflector and further illustrates placement of a reflector within a scintillator array.

With reference to FIG. 5, to improve reflectivity and light collection efficiency of scintillator/diode detector elements (not shown) in detector array (not shown), a new composite thermoplastic film reflector is used between elements (not shown), the new composite thermoplastic film reflector including at least one thermoplastic film (not shown). Suitable encasement material for the reflective film used herein includes but is not limited to a thermoplastic. As used herein, the term "thermoplastic" includes any material which has in whole or part, a linear macromolecular structure that will repeatedly soften when heated and harden when cooled. In one embodiment, a thermoplastic is used that is readily malleable and flexible at room temperature for fabrication purposes, offers higher resistance to color center formation and provides resistance to X-ray radiation damage. Also in one embodiment, the thermoplastic either has an adhesive surface or is capable of adhering to a surface upon which an adhesive has been applied.

In one embodiment, the thermoplastic material is capable of being bonded to by being laminated with or stuck with an adhesive to the reflective film.

In one embodiment, reflective films useful herein include 3M visible mirror film, Hitachi, and NKK TiO2 doped plastic films. The thickness of the "encased" reflector is such that an outside dimension is accommodated by an interior fit or placement within the scintillator array. Upon insertion of the reflector of this invention into a gap of the wafer stack, the stack is thereafter heated, pressure is applied if necessary to effectively bonded the wafer stack together sufficiently adherent to accommodate a subsequent slicing. The other dimensions of the encased reflective film will be in general accordance with the dimensions of the wafers with which the film is to be utilized.

With reference to FIG. 5, in one embodiment, a scintillator wafer is stacked vertically upon one another of several others of similar kind and similar size, creating a 0.002 inch vertical gap 106 between adjacent stacked wafers 108. Gaps 106 are then filled with a reflector of this invention which in turn comprises a thermoplastic film (not shown), a reflector film (not shown) and another thermoplastic film (not shown) with reflector film (not shown) sandwiched therebetween by laminating reflector film (not shown) between thermoplastic films (not shown).

With further reference to FIG. 5, in this embodiment, in more detail, a first thermoplastic film is inserted in gap 106, a reflective film is then inserted between the inserted thermoplastic film and an adjacent wafer face in gap 106 remaining open, and thereafter a second thermoplastic film is inserted in gap 106 remaining open, between the inserted reflective film face and an adjacent wafer face thus closing gap 106. Suitable heat and pressure are applied to the wafer stack to carry out effective lamination of the thermoplastic and reflective film and achieving adherence to the wafers in stack 108. Lamination of a thermoplastic to a reflective film in embodiments of the present invention are readily carried out according to lamination processes known in the art.

A series of parallel vertical cuts 110 is made on stack 108 using a suitable cutting or dicing process creating a section 112. In one embodiment, cuts are made to provide a stack 112 having a thickness of about 1.0 mm. A series of parallel horizontal cuts 110 are then made on stack 108 using a suitable cutting or dicing process creating sections 114. These sections 114 can then be cast together into a final scintillator array or pack.

In an embodiment and with continued reference to FIG. 5, the thermoplastic material can be any suitable thermoplastic adhesive material. In this embodiment additional heat and pressure are not necessary to carry out effective bonding between the reflective film and thermoplastic films creating an encased reflective film. The additional heat and pressure are not necessary because the thermoplastic and reflective film are held together by an adhesive which is applied to either the thermoplastic or reflective film.

In an embodiment, a reflective film is deposited directly onto a thermoplastic sheet and is then laminated with another layer of thermoplastic material. The laminated reflective material is then inserted into the gap between the wafers. Additionally, in an exemplary embodiment, the reflective film is a low x-ray damageable material. As used herein a low x-ray damageable material refers to a material in which each cell suffers no more than a ten percent loss of output due to discoloration after sustaining a cumulative dose of 1 megarad (MR).

In an embodiment, a bar 114 is created by a second cut in a stack of wafers. Bars 114 are assembled into a scintillator array. The gaps between bars are then filled with the reflector material.

Embodiments of the present invention use thin reflective film in one or two dimensions of the scintillator array, that are less susceptible to radiation damage and more resistant to color center formation than known cast reflectors, and more resistant to cross talk between scintillator elements. Use of improved reflector embodiments of the present invention in one or more dimensions makes it possible to avoid the use of collimator wires, thereby providing a beneficial cost savings. The elimination of collimator wires and use of potentially thinner reflectors allows use of detectors to acquire data representation of thinner slices in the z-direction. Laminates can be thinner than current cast materials and advantageously provide for more exposed scintillator thereby improving the detector quantum detection efficiency.

While the invention has been described in terms of various specific embodiments, those skilled in the art will recognize that the invention can be practiced with modification within the spirit and scope of the claims.

What is claimed is:

1. A method for fabricating a photodetector array including a photosensor array and scintillators, said method comprising the steps of:

placing a thermoplastically encased reflective film between and in front of the scintillators of a scintillator array; and optically coupling the scintillators with the photosensor array.

2. A method in accordance with claim 1 wherein the encased reflective film is prepared by positioning a reflective film within a thermoplastic film and affixing said thermoplastic film to the reflective film.

3. A method in accordance with claim 2 wherein said step of affixing comprises laminating the thermoplastic material to the reflective film.

4. A method in accordance with claim 2 wherein the reflective film is encased in a process comprising depositing the reflective film directly on a thermoplastic sheet and laminating it with another layer of thermoplastic material.

5. A method in accordance with claim 2 wherein said reflective film is a low x-ray damageable material.

6. A photodetector array comprising:

an array of scintillators optically coupled to a photosensor array; and a thermoplastically encased reflective film positioned between and in front of said scintillators of said array of scintillators.

7. The photodetector array of claim 6 wherein said array is employed in a computed tomography imaging system.

8. The photodetector array of claim 7 wherein said reflective film is thermoplastically encased in a process comprising depositing the reflective film directly on a thermoplastic sheet and laminating it with another layer of thermoplastic material.

9. The photodetector array of claim 8 wherein said reflective film is a low x-ray damageable material.

10. A computed tomography imaging system comprising a rotating gantry, a radiation source, and a detector array on the rotating gantry configured to detect attenuated radiation from the radiation source passing through an object between the radiation source and the detector array, the detector array comprising a photosensor array, an array of scintillators, and a thermoplastically encased reflective film within said scintillator array, wherein said photosensor array is optically coupled to said scintiliator array, and said thermoplastically encased reflective film is positioned between and in front of scintillators of said scintillator array.

11. The imaging system of claim 10 wherein the object is a patient.

12. The imaging system of claim 10 wherein said reflective film is encased in a process comprising depositing the reflective film directly on a thermoplastic sheet and laminating it with another layer of thermoplastic material.

13. The imaging system of claim 10 wherein said reflective film is a low x-ray damageable material.

* * * * *

UNITED STATES PATENT AND TRADEMARK OFFICE
CERTIFICATE OF CORRECTION

| | |
|---|---|
| PATENT NO. | : 6,904,304 B2 |
| APPLICATION NO. | : 10/136143 |
| DATED | : June 7, 2005 |
| INVENTOR(S) | : Hoffman |

It is certified that error appears in the above-identified patent and that said Letters Patent is hereby corrected as shown below:

Column 6, line 54, delete "said scintiliator array" and insert therefor -- said scintillator array --.

Signed and Sealed this

Eighteenth Day of December, 2007

JON W. DUDAS
*Director of the United States Patent and Trademark Office*